Aug. 31, 1965    J. W. BEISHEIM ETAL    3,203,096
ELECTRIC SLICING KNIFE

Filed July 29, 1963    3 Sheets-Sheet 1

Inventors:
James W. Beisheim
Otto F. Gerry
by Leonard J. Platt
Their Attorney

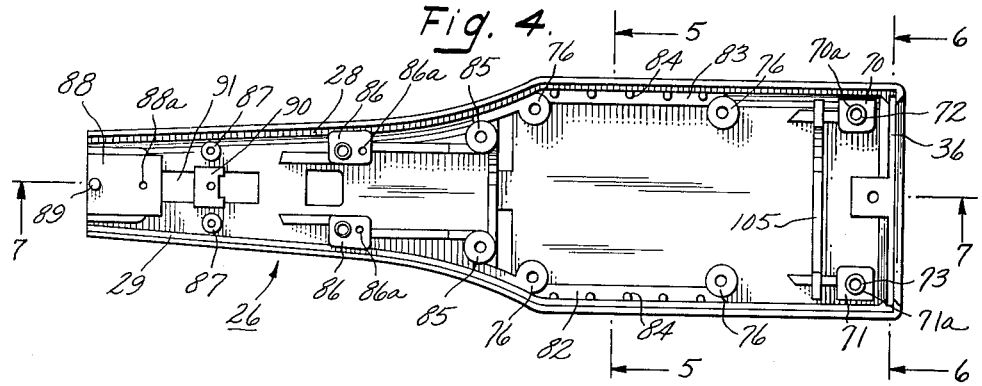
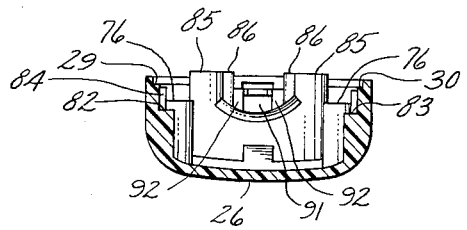
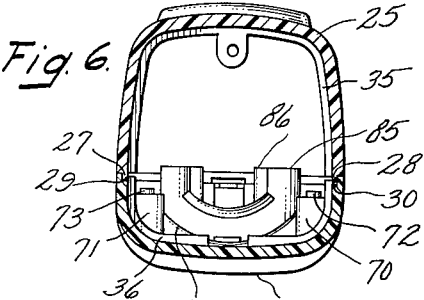
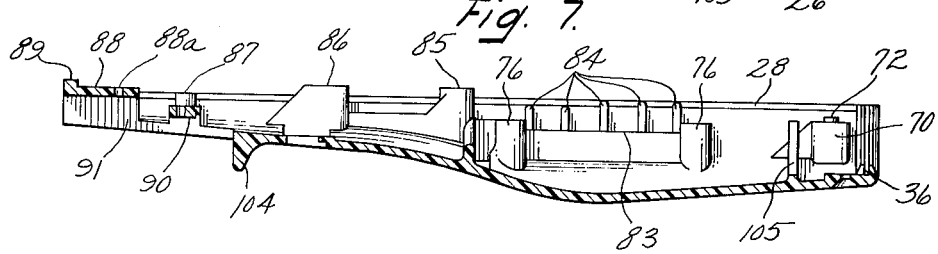
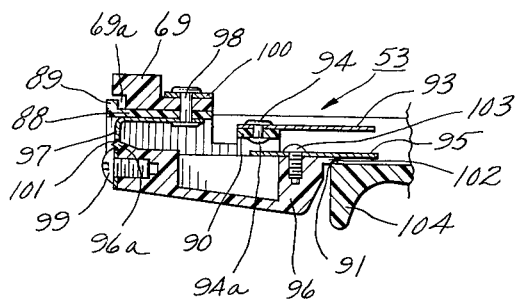

Aug. 31, 1965　　　J. W. BEISHEIM ETAL　　　3,203,096
ELECTRIC SLICING KNIFE
Filed July 29, 1963　　　　　　　　　　　　3 Sheets-Sheet 3

Inventors:
James W. Beisheim
Otto F. Gerry
by Zenard Platt
Their Attorney

United States Patent Office 3,203,096
Patented Aug. 31, 1965

3,203,096
ELECTRIC SLICING KNIFE
James W. Beisheim, Spencerport, and Otto F. Gerry, Brockport, N.Y., assignors to General Electric Company, a corporation of New York
Filed July 29, 1963, Ser. No. 298,302
8 Claims. (Cl. 30—272)

This invention relates to electric slicing knives and in particular to such knives designed for manual manipulation by the user.

Over the past ten or fifteen years, there has been a tremendous increase in the use of household appliances to assist the housewife in her everyday chores. This is particularly true with respect to electrically powered hand-held appliances for the kitchen where increased time and effort for food preparation has resulted from the increase in average family size and in home entertainment. Among the reasons that powered-operated slicing knives have not proven acceptable for the cutting of bread, vegetables, meat and the like in the home have been the excessive weight, the difficulty of hand manipulation, the lack of safety features, and the expense and difficulties of mass production associated with many prior knives.

Accordingly, it is one object of this invention to provide an electrically operated slicing knife of low cost, lightweight construction having its components designed for convenience of mass production.

It is yet another object of this invention to provide a hand-held electrically operated slicing knife which may be conveniently operated and controlled safely by one hand of the user.

It is a still further object of this invention to provide such a knife having improved means for cooling the knife.

In carrying out the objects of our invention in one form thereof, an electrically operated slicing knife is provided having a two-piece handle housing of insulative material. The housing includes a rearward enlarged motor-enclosing portion and a narrowed forward gripping portion which houses the transmission and connecting means to drive the knife blades. A motor switch is mounted within the housing having a movable operator conveniently positioned at the bottom forward end of the gripping portion. As the center of mass of the knife is rearward of the gripping portion the thumb of the gripping hand balances the knife by downward pressure on the top surface of the forward end of the housing while the index finger operates the switch.

In accordance with another aspect of our invention a pair of integrally formed portions of the housing are positioned adjacent the switch operator to prevent accidential closing of the switch.

Another feature of our invention utilizes integrally formed means within a two-piece knife housing to provide supporting structure for the knife motor, the transmission, the knife blade connectors and the switch. Integral housing surfaces also aid in securing the two pieces of the housing to one another.

In accordance with a still further aspect of our invention a unique motor cooling arrangement is provided including a motor driven fan and a fan-encircling shroud. The shroud is formed by a portion of the knife housing and a separable member which also houses the knife motor brushes. Additional air flow passages are provided in the housing.

Other objects and advantages of our invention may best be understood by reference to the following description taken in connection with the accompanying drawings in which:

FIG. 4 is a plan view of the body of the slicing knife housing with the motor and blade drive mechanism removed;

FIG. 5 is a sectional view taken on line 5—5 of FIG. 4;

FIG. 6 is a sectional view taken on line 6—6 of FIG. 4 with a portion of the cover being shown to reveal certain elements;

FIG. 7 is a sectional view taken on line 7—7 of FIG. 4;

FIG. 8 is a sectional view taken on line 8—8 of FIG. 3 showing only the knife switch;

Figure 1:
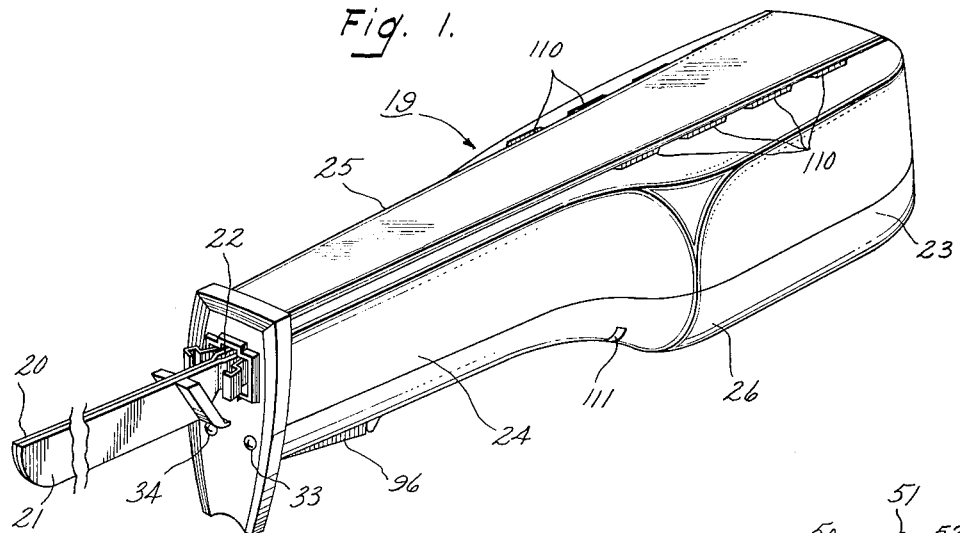
FIG. 1 is a perspective view of the electric slicing knife.

The power-operated slicing knife of this invention is shown in FIG. 1 having an elongated handle housing 19 of unique form which encloses the motor and driving mechanism of the knife and a pair of knife blades 20 and 21 which pass through an aperture 22 in one end of the housing for engagement with the drive mechanism.

Figure 2:
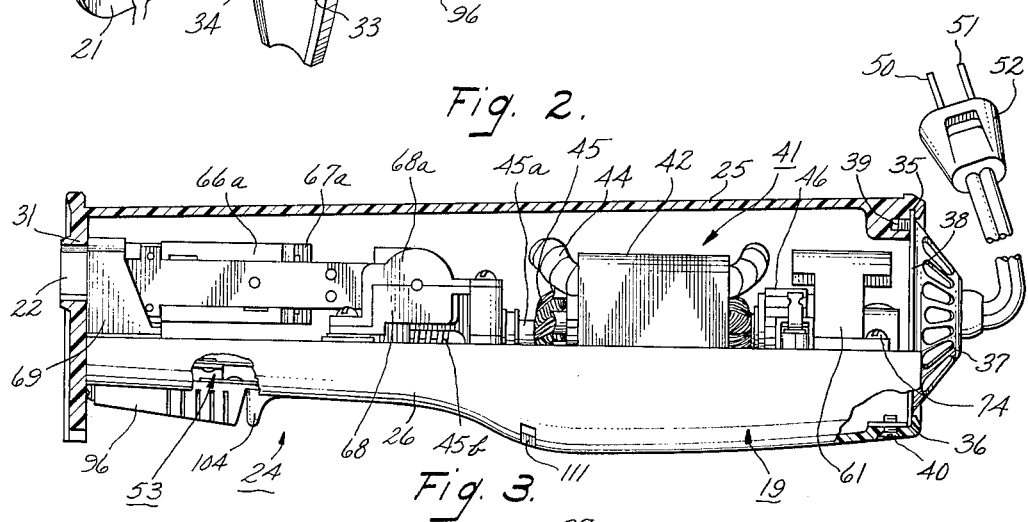
FIG. 2 is a side view of the knife of FIG. 1 with the housing cover being cut away to reveal the elements within the housing.

Housing 19 comprises an enlarged rearward portion 23 which encloses the knife motor and a tapered forward gripping portion 24 sized so as to be readily grasped by the hand of the user and permitting the fingers to completely surround the housing. As best seen in FIG. 2, housing 19 is constructed of two pieces 25 and 26 of thermoplastic such as the polycarbonate resin sold under the trademark "Lexan." The plastic pieces are joined along generally medial longitudinal surfaces with upper piece or cover 25 providing downwardly extending integral longitudinal projections 27 and 28 (see FIG. 6) which are accommodated in longitudinal recesses 29 and 30 respectively of lower piece or body 26. Cover 25 includes an integral front end piece or hilt 31 which extends downwardly below the lower surface of the gripping portion 24. A pair of fasteners 33 and 34, as shown in FIG. 1, extend through hilt 31 to secure cover 25 to body 26 at their forward ends.

The rearward ends of pieces 25 and 26 are provided with opposed integrally formed channels 35 and 36, respectively. A back plate or grill assembly 37 which includes a forward peripheral edge 38 resides in channels 35 and 36. Fasteners 39 and 40 connect grill assembly 37 to plastic pieces 25 and 26 respectively to rigidly secure the grill assembly to the housing and to firmly unite pieces 25 and 26 at their rear ends.

Figure 3:
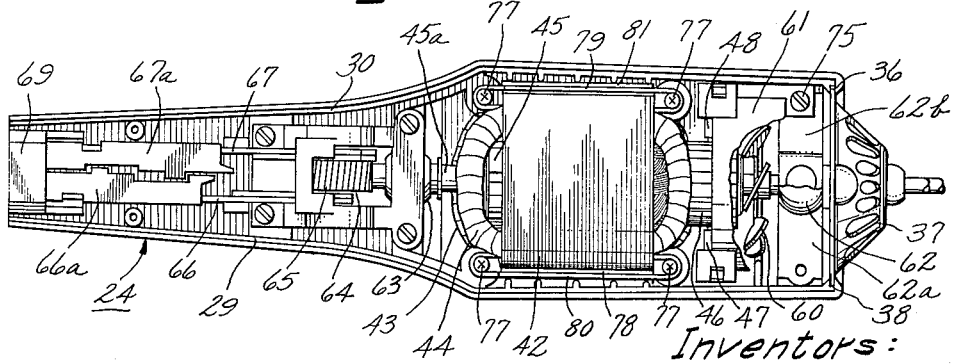
FIG. 3 is a plan view of the slicing knife with the cover removed.

The motor and drive elements of the knife are shown in FIGS. 2 and 3. Rearward portion 23 of housing 19 encloses a series wound or universal motor 41 of fractional horsepower having a field 42, a lower winding 43, an upper winding 44, an armature 45 having a shaft 45a, a commutator 46, and a pair of brushes 47 and 48. Motor 41 may be energized through terminals 50 and 51 of a connector 52 which is adapted for connection to a conventional alternating current household power source. The circuit through the motor is connected serially from terminal 50 to brush 48 through armature 45 to brush 47 to lower field winding 43 through a switch 53, to upper field winding 44 and back to terminal 51. The connecting wires have been omitted from the drawing for clarity.

A fan 60 is also secured to the rearward portion of the armature shaft for cooling the motor. A shroud 61 is spaced radially from the upper portion of fan 60, arranged concentrically with respect thereto, to control the airflow from the fan. Armature shaft 45a is supported by a rearward bearing 62 and a forward bearing 63. Rearward bearing 62 is supported between a pair of metal elements 62a and 62b.

To convert the rotation of armature shaft 45a to counter-reciprocating motions of blades 20 and 21, a transmission, shown generally at 64, is housed within forward gripping portion 24 of the housing. Transmission 64 includes a worm gear 65 which meshes with a worm 45b formed on the forward end of shaft 45a beneath worm gear 65. A scotch yoke type mechanism may be utilized to drive a pair of connecting rods 66 and 67 with counter-reciprocating longitudinal motion from gear 65. A bearing seat 68 and bearing seat retainer 68a support gear 65 and forward armature bearing 62 rotatably.

Connecting rods 66 and 67 extend forwardly to a point adjacent aperture 22, a pair of blade receiving elements 66a and 67a being respectively secured to rods 66 and 67. A guide 69 secured in the forward end of housing 19, is adapted to receive the forward ends of elements 66a and 67a and includes an aperture which is aligned with aperture 22, for the passage of portions of blades 20 and 21 therethrough.

It can be seen from examination of FIGS. 2 and 3 that the elements of the motor and drive mechanism of the knife are all mounted in lower housing piece or body 26 with upper piece 25 providing only a cover and hilt 31. In accordance with one aspect of my invention, body 26 incorporates a plurality of unique integrally molded support elements positioned and dimensioned to insure the rigid, insulated support of the drive components with a minimum of parts. Among these molded elements are a plurality of upstanding projections defining fastener receiving holes which coincide with holes in components desired to be secured to body 26. To clearly understand the support features provided by body 26, FIGS. 4–7 must be considered in light of the components discussed above which are supported therein.

Adjacent the rear of the body are a pair of projections 70 and 71 having holes 70a and 71a, respectively, formed therein, and adapted to receive threaded brass inserts 72 and 73 which in turn receive screws 74 and 75 (see FIGS. 2 and 3) which pass through rear extensions of shroud 61 to securely hold the shroud in place. Rear bearing support elements 62a and 62b are sandwiched between the rear extensions of shroud 61 and projections 70 and 71, being apertured for mounting with screws 74 and 75 also. It has been found desirable to use threaded inserts in projections 70 and 71 due to the high heat conditions in this area and the relatively high bearing forces absorbed.

A plurality of integral elements in the rearward portion 23 of housing 19 are utilized to support the motor components. Projections 76 receive fasteners 77, the heads of which clamp hold-down-wires 78 and 79 to secure respective, laterally extending, horizontal legs 80 and 81 of field 42 against integrally formed ledges 82 and 83 formed in the side walls of body 26. A plurality of vertical ridges 84 are formed in the sides of body 26 adjacent the motor area to assist in the proper positioning of field 42 in body 26. The three rearmost ridges on each side are extended above the level of recesses 29 and 30 to form receiving channels therewith for cover projections 27 and 28.

Rear projections 85 and forward projections 86, formed in the gripping portion of body 26 are adapted to receive suitable fasteners which project downwardly through bearing seat retainer 68a and bearing seat 68 to firmly mount these elements to body 26. Forward projections 86 are provided with cylindrical recesses 86a which receive downwardly extending guide pins (not shown) formed on bearing seat 57 to accurately position the bearing seat. Projections 86 are positioned so that their outer vertical surfaces are adjacent recesses 29 and 30 to form a channel at two points for the reception of projections 27 and 28 of cover 25. The outer vertical surfaces of another pair of projections 87 and of channel 36 also cooperate with recesses 29 and 30 to form a receiving channel for cover 25.

A platform 88 is integrally formed with body 26, adjacent the forward end thereof, with guide 69 being secured to the top surface of platform 88 by any suitable fastener which extends through aperture 88a. A short cylindrical projection 89 is formed in the forward end of platform 88 to mate with a recess 69a (see FIG. 8) in the bottom of guide member 69.

In addition to providing integral structure for insulative mounting of the various components of the knife drive mechanism, body 26 includes integral supporting elements for motor operating switch 53 as shown in FIG. 8. An integral horizontal plate 90 is spaced above a longitudinal aperture 91 in the bottom of body 26 by a pair of vertical integral legs 92 so that plate 90 straddles aperture 91. A longitudinally extending terminal arm 93 is secured by a fixed silver rivet or contact 94 to the top surface of plate 90.

To complete the electrical circuit through the knife motor a movable contact arm 95 is secured to a hollow movable bar or button 96 for engagement with contact 94. Button 96 is resiliently secured to the lower surface of platform 88 by an L-shaped spring 97. Spring 97 is riveted or otherwise firmly secured to platform 88 by a fastener 98, which passes through aperture 88a in platform 88, and is secured at its other end by a fastener 99 to the forward vertical surface of button 96. It can be seen in FIG. 8 that fastener 98 extends through a hold-down plate 100, guide 69, platform 88 and spring 97 to secure these elements tightly together. An integrally formed pin or projection 96a on button 96 is adapted to mate with an aperture 101 in spring 97 to properly position button 96 on spring 97. A rearward tang 102 integrally formed with button 96 overlies the upper surface of the base of body 26 to hold the button within the housing against a strong bias of spring 97 which tends to rotate the button clockwise as viewed in FIG. 8.

Movable contact arm 95 is secured to button 96 by a fastener 103 beneath terminal arm 93 so that the counterclockwise rotation of button 96 against the bias of spring 97 rotates the forward portion of arm 95 into contact with a lower head 94a of rivet 94 to complete the motor circuit. The movement of button 96 to the closed position is partially guided by vertical legs 92. The rearward portion of movable contact arm 95 provides a terminal for connection of contact 94 in the motor circuit.

Terminal arm 93 is pivoted horizontally about contact 94 to an acute angle to the longitudinal axis of housing 19 after having the motor wiring secured to its rearward end. This prevents closing of the switch between the head of fastener 103 and terminal arm 93. It is desirable to insure switch closing and opening between rivet 94a and contact arm 95 as they are particularly designed for long life.

As another feature of our invention is should be noted that hilt 31 extends downwardly below the lowermost surface of button 96 to prevent accidental actuation of swich 53. Additionally, an integrally formed guard 104 is positioned immediately to the rear of button 96 and extends downwardly at least as far as the lowermost portion of button 96 when the button is in its normally open position shown in FIG. 8.

The singular form of housing 19 and the positioning of switch button 96 is of particular significance in our electric slicing knife. To achieve maximum control of the knife blades during operation and optimum handling convenience, our knife housing has been designed to permit the user to grasp the knife immediately to the rear of the cutting portions of the knife blades. In our improved knife the major gripping and guiding forces are supplied by the thumb and last three fingers of the hand and the index finger is left relatively free for operating the motor switch.

As the motor is relatively bulky, the enlarged housing portion is provided at the rear of the housing away from the knife blades. The housing is tapered forwardly from the motor enclosing portion into a narrowed forward portion which encloses the knife drive mechanism and permits complete grasping or encircling by the fingers of the operating hand.

Figure 9:
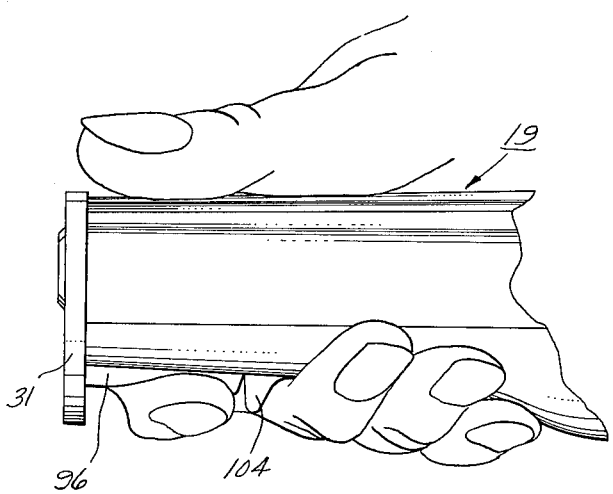
FIG. 9 depicts the convenient one-hand manipulation and operation of the knife.

It can be seen that the weight of the motor results in the center of mass of the knife being located rearwardly of the grasping hand. To overcome this unbalance when the forward narrowed portion is grasped, the upper forward surface of housing 19 is pressed downwardly by the thumb to achieve proper balance as shown in FIG. 9. It has been found that with a power-operated knife having a pair of rapidly reciprocating blades, it is merely necessary for the operator to apply a light downward pressure to the blades to guide them through most foodstuffs. Such light guiding pressure is also provided by the user's thumb.

As shown in FIGS. 2 and 9 switch operating button 96 is positioned adjacent the lower forward end of the housing for controlling operation of the electric knife motor. Thus, switch operating button 96 is located so that it may be readily and safely actuated by the index finger without requiring a repositioning of the thumb or the last three fingers of the operator's hand.

A normal grasping relationship will cause the index finger to apply upward pressure on the button 96 to operate the knife motor. The rigidity of spring 97 is sufficient such that squeezing by the index finger is necessary to close the switch arm 95 against contact 94 and to insure immediate opening of the switch upon even slight release of the button by the operator. The length of button 96 is sufficient to permit convenient operation for operators having hands of different sizes. Furthermore, button 96 also provides a relatively long lever arm to reduce the pressure required to close the switch while permitting the use of a relatively rigid spring for quick opening.

The location of switch guard 104, in addition to its safety feature, also provides a stop against which the operator's index finger may rest while engaging the switch button during operation of the knife. Thus, a convenient operating means is provided for the slicing knife which permits ready, simple, non-fumbling operation, so that the user may concentrate his attention on the position of the knife blades, thereby maximizing the safety of operation.

As another feature of our operation, means are provided within housing 19 to maximize the cooling of motor 41. Housing 19 includes upper ventilating apertures 110 and lower ventilating apertures 111 (see FIG. 1) which cooperate with grill assembly 37 to provide passages through the housing for thorough cooling ventilation of motor 41 by fan 60. The fan is arranged to draw air into the motor housing 19 through vents 110 and 111 and past the motor and to exhaust the air through grill assembly 37. Thus the direction of airflow is from front to rear. Such airflow has been found preferable for maintaining a cool housing for comfortable handling.

Figure 10:
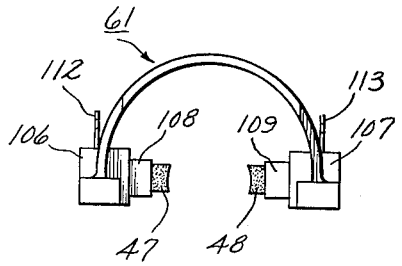
FIG. 10 shows a front view of the combined fan shroud and brush holder member.
Figure 11:
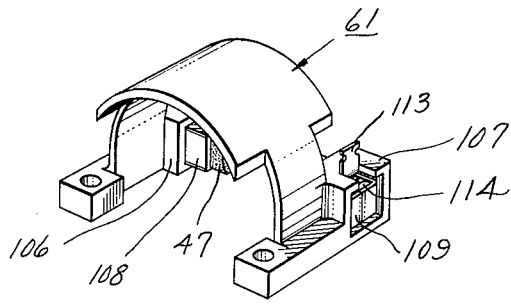
FIG. 11 shows a perspective view of the fan shroud and brush holder member of FIG. 10.

A unique shroud arrangement encircles the periphery of fan 49 to insure adequate airflow in housing 19. The lower portion of this arrangement is provided by integrally molded baffle 105 as may be seen in FIGS. 4, 6 and 7. Shroud 61, shown in FIGS. 10 and 11 is particularly adapted to cooperate with the other elements of the knife to accomplish a plurality of functions. First, it provides the upper half of the fan shroud means, and together with baffle 105 induces a "wind tunnel" effect in the rear portion of the housing.

Secondly, shroud 61 includes an integrally formed pair of brush casings 106 and 107, the shroud being preferably preformed of nylon and therefore highly insulative. Box-like brush holders 108 and 109 are respectively positioned in brush casings 106 and 107, and provide a pair of vertically extending integral brush terminals 112 and 113, respectively. Holders 108 and 109 enclose carbon brushes 47 and 48 respectively which are biased radially inwardly into contact with commuator 46 by horizontally arranged coil springs positioned between the outer surface of each brush and the outer wall of the brush casings as shown at 114 for brush 48.

Shroud 61 performs a third function by preventing motor wiring, extending from the grill assembly 37 to the brushes, from becoming entangled in fan 60. As mentioned above, integrally formed rearwardly extending legs of shroud 61 are apertured for fastening to projections 70 and 71 in lower housing piece 26.

We have thus disclosed an electric slicing knife having a two-piece plastic housing which is particularly adapted to simplify the securing of the electric motor and its related parts thereto with a minimum of additional supporting elements and production time. The housing body not only provides a portion of the housing but additionally supplies a plurality of integrally formed fastening elements, support portions, and functional portions of the switch and cooling means for the knife. Furthermore, the use of the body as a supporting means greatly simplifies production methods in that the various motor and drive components may be added to this lower housing piece easily and conveniently from above as it moves along an assembly line. It can be seen that the entire knife may be assembled to the body 26 prior to the final addition of cover 25.

The "Lexan" thermoplastic material is ideally suited for the housing of an electric culinary appliance in that it is odor, grease and heat resistant as well as insulative. To cleanse the knife housing it may be wiped with a damp, sudsy cloth.

It is to be understood that the particular construction described herein is by way of example only and it is the aim of the appended claims to cover all such equivalent variations as come within the true spirit and scope of the foregoing disclosure.

What is claimed as new and desired to be secured by Letters Patent of the United States is:

1. An electrically operated slicing knife comprising:
   (a) a housing having a rearward portion and a forward portion which is of such size that it may readily be gripped by the hand of a user so that the fingers may completely surround the housing;
   (b) an electric motor positioned entirely within said rearward portion so that the center of mass of the knife is rearward of said forward portion;
   (c) a driven mechanism within said forward portion connected to said motor;
   (d) a knife blade adapted for connection to said driven mechanism;
   (e) a pair of switch contacts positioned within said forward portion for controlling energization of said motor;
   (f) a movable switch member positioned adjacent the forward end of the bottom of said forward portion immediately below said switch contacts and having one of said contacts secured thereto;
   (g) resilient means secured to said housing and to the forward end of said switch member for biasing said member to an open position, said switch member being pivotal about said resilient means to close said pair of contacts;
   (h) said switch member extending rearwardly from the forward lower end of said forward portion of said housing to provide convenient operation of said knife by the squeezing action of the index finger of the user when said housing is grasped by said forward portion.

2. The slicing knife recited in claim 1 wherein said resilient means comprises an L-shaped spring having a horizontal leg secured to said housing and a vertical leg secured to said switch member.

3. An electrically operated slicing knife comprising:
 (a) a housing including:
  (aa) a forward gripping portion of such size that it may readily be grasped by the hand of the user, and
  (bb) a rearward portion;
 (b) an electric motor completely positioned within said rearward portion;
 (c) a driving mechanism within said forward gripping portion connected to said motor;
 (d) a knife blade extending forwardly from said housing and adapted to be driven by said driving mechanism;
 (e) a motor switch within said housing having a movable operator positioned on the bottom of said forward gripping portion, said operator being arranged for movement to close said switch upon the application of pressure from the index finger of the hand gripping the knife;
 (f) a surface on said housing located forwardly from said switch operator and extending downwardly below the lowermost point of said switch operator at all times; and
 (g) a safety guard on said housing adjacent the rearmost portion of said switch operator extending downwardly from the bottom of said housing to at least the lowermost point of said switch operator to prevent accidental operation of the knife.

4. An electrically operated slicing knife comprising:
 (a) a housing;
 (b) an electric motor secured in said housing;
 (c) a driven mechanism within said housing connected to said motor;
 (d) a knife blade connected to said driven means for operation by said motor;
 (e) a fan driven by said motor;
 (f) a first arcuate shroud element integrally formed in said housing and radially spaced with respect to a portion of said fan;
 (g) a second arcuate shroud element radially spaced with respect to the remaining portion of said fan so that a high velocity airflow is provided over said motor for the cooling thereof; and
 (h) said second shroud element including means for supporting a pair of motor brushes.

5. In an electrically operated slicing knife having a housing, an electric motor, a commutator for the motor, a driven means operated by the motor, and a knife blade connected to the driven means, means for ventilating the driven means and the motor comprising:
 (a) a multi-bladed fan driven by said motor;
 (b) a first semi-cylindrical shroud member integrally formed in said housing and concentrically positioned with respect to a portion of said fan;
 (c) a second semi-cylindrical shroud member concentrically positioned with respect to the remaining portion of said fan;
 (d) a pair of casings integrally formed with one of said shroud members; and
 (e) a pair of brush elements supported in said casings on opposite sides of said commutator for engagement therewith.

6. In an electrically operated slicing knife having a housing, an electric motor, a commutator for the motor, a driven means operated by the motor, a fan operated by the motor, and a knife blade connected to the driven means, a molded shroud comprising:
 (a) a semi-cylindrical surface radially spaced from a portion of the fan;
 (b) a pair of integral lateral flanges each including:
  (aa) means for securing said shroud to the housing; and
  (bb) an integral brush casing,
 (c) means secured in each of said casings including:
  (aa) a motor brush,
  (bb) a terminal adapted to be connected to a source of power, and
  (cc) means biasing said brush into engagement with the motor commutator.

7. An electrically operated slicing knife comprising:
 (a) an elongated housing having a rearward motor enclosing portion and a forward handle portion of a size to be readily gripped by the hand of the user so that the fingers may completely surround the housing;
 (b) an electric motor positioned within said housing motor portion;
 (c) a pair of knife blades extending into said housing to be drivingly connected to said motor;
 (d) an aperture located in the lower wall of said handle portion;
 (e) a pair of legs formed integral with said housing and extending upwardly on opposite sides of said aperture;
 (f) a horizontal plate formed integral with said legs spaced above said aperture so that the plate straddles the aperture;
 (g) a movable switch member positioned within said aperture and having a manually engageable surface extending outwardly from the handle portion;
 (h) a pair of switch contacts for controlling the energization of said motor including a fixed contact secured to said plate and a movable contact normally spaced from said fixed contact and movable into engagement with said fixed contact by said switch member; and
 (i) resilient means engaging said housing and said switch member urging said member in a direction to maintain said movable contact away from said fixed contact so that the movable contact may be moved into engagement with the fixed contact by the squeezing action of the index finger of the user against said switch member when said housing is grasped by said handle portion.

8. An electrically operated slicing knife comprising:
 (a) a housing including:
  (aa) a forward gripping portion of such size that it may readily be grasped by the hand of the user, and
  (bb) a rearward portion having means on its lower side defining a relatively flat surface for engaging a horizontal support surface;
 (b) an electric motor positioned completely within said rearward portion;
 (c) a driving mechanism within said forward gripping portion connected to said motor;
 (d) a knife blade extending forwardly from said housing and adapted to be driven by said driving mechanism;
 (e) a motor switch within said housing having a movable operator positioned on the bottom of said forward gripping portion, said operator being arranged for movement to close said switch upon the application of pressure from the index finger of the hand gripping the knife;
 (f) a forward surface on said housing extending downwardly below the lowermost point of said switch operator at all times whereby the knife housing may rest on a horizontal supporting surface with said flat surface and the lower edge of said forward surface engaging the supporting surface; and
 (g) a safety guard on said housing adjacent the rearmost portion of said switch operator extending downwardly from the bottom of said housing to at least the lowermost point of said switch operator to prevent accidental operation of the knife, said guard not extending below the plane formed by the lower edge of said forward surface and said rear flat surface.

References Cited by the Examiner

UNITED STATES PATENTS

| | | | |
|---|---|---|---|
| 1,858,887 | 5/32 | Dremel | 30—216 |
| 2,015,535 | 9/35 | Sacrey | 30—272 |
| 2,168,703 | 8/39 | Dziedzic et al. | 30—173 |
| 2,199,618 | 5/40 | Conover | 30—272 |
| 2,225,580 | 12/40 | Wiggins | 30—228 |
| 2,320,784 | 6/43 | Livingston et al. | 30—272 |
| 2,650,993 | 9/53 | Brown et al. | 30—216 X |
| 2,753,470 | 7/56 | Armstrong | 30—272 X |
| 2,945,298 | 7/60 | Guttmann | 30—272 |
| 2,984,757 | 5/61 | Papworth. | |
| 2,990,614 | 7/61 | Taggart | 30—272 |

WILLIAM FELDMAN, *Primary Examiner.*

MILTON S. MEHR, M. HENSON WOOD, JR.,
*Examiners.*